(12) United States Patent
Hanket et al.

(10) Patent No.: US 9,232,025 B2
(45) Date of Patent: Jan. 5, 2016

(54) ENTRY OF ELECTRIC POWER DELIVERY SYSTEM DATA IN A WEB-BASED INTERFACE

(71) Applicant: Schweitzer Engineering Laboratories, Inc., Pullman, WA (US)

(72) Inventors: Glen W. Hanket, Pullman, WA (US); Matthew J. Howell, Pullman, WA (US); Gabriel DeRuwe, Moscow, ID (US); Thomas Allen Stanley, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 455 days.

(21) Appl. No.: 13/756,775

(22) Filed: Feb. 1, 2013

(65) Prior Publication Data

US 2014/0222233 A1 Aug. 7, 2014

(51) Int. Cl.
| | | |
|---|---|---|
| G06F 17/00 | (2006.01) | |
| H04L 29/06 | (2006.01) | |
| G06F 17/24 | (2006.01) | |
| H02J 3/00 | (2006.01) | |
| H02J 13/00 | (2006.01) | |

(52) U.S. Cl.
CPC .............. *H04L 67/42* (2013.01); *G06F 17/243* (2013.01); *H02J 3/00* (2013.01); *H02J 13/0062* (2013.01); *H02J 13/0075* (2013.01)

(58) Field of Classification Search
CPC .................................................... G06F 17/243
See application file for complete search history.

(56) References Cited

U.S. PATENT DOCUMENTS

| | | | | |
|---|---|---|---|---|
| 5,367,619 A | * | 11/1994 | Dipaolo et al. ............... | 715/221 |
| 7,433,072 B2 | * | 10/2008 | Nishikawa ................... | 358/1.18 |
| 7,523,391 B1 | * | 4/2009 | Eizenhoefer .................. | 715/224 |
| 7,590,932 B2 | * | 9/2009 | Britton et al. ................. | 715/222 |
| 7,685,144 B1 | * | 3/2010 | Katragadda ............ | 707/999.101 |
| 7,716,168 B2 | * | 5/2010 | Selca et al. | |
| 7,716,590 B1 | * | 5/2010 | Nathan ......................... | 715/738 |
| 8,127,224 B2 | * | 2/2012 | Vincent, III ................... | 715/222 |
| 8,224,853 B2 | * | 7/2012 | van Wyk et al. ............... | 707/790 |
| 8,335,982 B1 | * | 12/2012 | Colton et al. .................. | 715/234 |
| 8,839,092 B2 | * | 9/2014 | Albornoz et al. ............. | 715/230 |
| 9,007,302 B1 | * | 4/2015 | Bandt-Horn ......... | G06F 3/0202 |
| | | | | 345/156 |
| 9,009,585 B1 | * | 4/2015 | Chetrit et al. .................. | 715/221 |
| 2002/0083154 A1 | * | 6/2002 | Auffray et al. ................ | 709/218 |
| 2002/0178190 A1 | * | 11/2002 | Pope et al. ..................... | 707/530 |
| 2003/0221165 A1 | * | 11/2003 | Young et al. .................. | 715/505 |
| 2004/0039991 A1 | * | 2/2004 | Hopkins et al. ............... | 715/507 |
| 2004/0080541 A1 | * | 4/2004 | Saiga .................... | G06F 3/0485 |
| | | | | 715/805 |
| 2005/0022112 A1 | * | 1/2005 | Kato ............................. | 715/505 |
| 2005/0071752 A1 | * | 3/2005 | Marlatt ......................... | 715/506 |

(Continued)

*Primary Examiner* — Laurie Ries

(74) *Attorney, Agent, or Firm* — Jared L. Cherry; Richard M. Edge

(57) ABSTRACT

Disclosed herein are a variety of systems and methods for entry of data relating to an electrical power delivery system using a web-based interface. One embodiment may include a computer program product having a client-side module to communicate with a server-side module. The client-side module may further include a web browser interface module to retrieve data entered by an operator into a data entry field in a web browser, a user interface module to display variable length data to a user via the web browser, and a communication module to manage communication with the server-side module. The communication module may further be configured to generate an object comprising data entered by the user into the web browser, transmit the object to the server, and receive a response from the server.

20 Claims, 6 Drawing Sheets

(56) References Cited

U.S. PATENT DOCUMENTS

| | | | |
|---|---|---|---|
| 2005/0071753 A1* | 3/2005 | Klein et al. | 715/508 |
| 2005/0086092 A1* | 4/2005 | Kowalski et al. | 705/8 |
| 2005/0134917 A1* | 6/2005 | Nishikawa | 358/1.18 |
| 2005/0275893 A1* | 12/2005 | Korn | 358/1.18 |
| 2006/0107197 A1* | 5/2006 | Friend et al. | 715/505 |
| 2006/0107224 A1* | 5/2006 | Friend et al. | 715/764 |
| 2006/0224948 A1* | 10/2006 | Desmond et al. | 715/507 |
| 2006/0242595 A1* | 10/2006 | Kizumi | G06F 3/0485 715/786 |
| 2006/0288269 A1* | 12/2006 | Oppenlander et al. | 715/505 |
| 2007/0022020 A1* | 1/2007 | Bernstein | 705/26 |
| 2008/0010591 A1* | 1/2008 | Good et al. | 715/255 |
| 2008/0208964 A1* | 8/2008 | Belyaev | 709/203 |
| 2008/0222522 A1* | 9/2008 | Morales | 715/276 |
| 2009/0235275 A1* | 9/2009 | Brown et al. | 719/313 |
| 2010/0083147 A1* | 4/2010 | Gaffney | 715/762 |
| 2011/0197124 A1* | 8/2011 | Garaventa | 715/234 |
| 2011/0225485 A1* | 9/2011 | Schnitt | 715/222 |
| 2011/0246867 A1* | 10/2011 | Tsutsumi | 715/222 |
| 2011/0252304 A1* | 10/2011 | Lemonik et al. | 715/234 |
| 2013/0117652 A1* | 5/2013 | Folsom et al. | 715/222 |
| 2013/0132832 A1* | 5/2013 | Nakamura | G06F 17/24 715/271 |
| 2013/0159835 A1* | 6/2013 | Khalil et al. | 715/234 |
| 2013/0198595 A1* | 8/2013 | Waldman et al. | 715/205 |
| 2014/0222233 A1* | 8/2014 | Hanket et al. | 700/295 |
| 2015/0052167 A1* | 2/2015 | Olster et al. | 707/769 |
| 2015/0161565 A1* | 6/2015 | Kraft | G06Q 10/00 348/441 |

\* cited by examiner

ENTRY OF ELECTRIC POWER DELIVERY SYSTEM DATA IN A WEB-BASED INTERFACE

TECHNICAL FIELD

This disclosure relates to systems and methods for entry of electric power delivery system data in web-based forms. More specifically, the systems and methods disclosed herein relate to the use of web-based forms for entering and/or updating configuration settings associated with intelligent electronic devices in an electric power delivery system.

BRIEF DESCRIPTION OF THE DRAWINGS

Non-limiting and non-exhaustive embodiments of the disclosure are described herein, including various embodiments of the disclosure with reference to the figures, in which.

DETAILED DESCRIPTION

Figure 1:
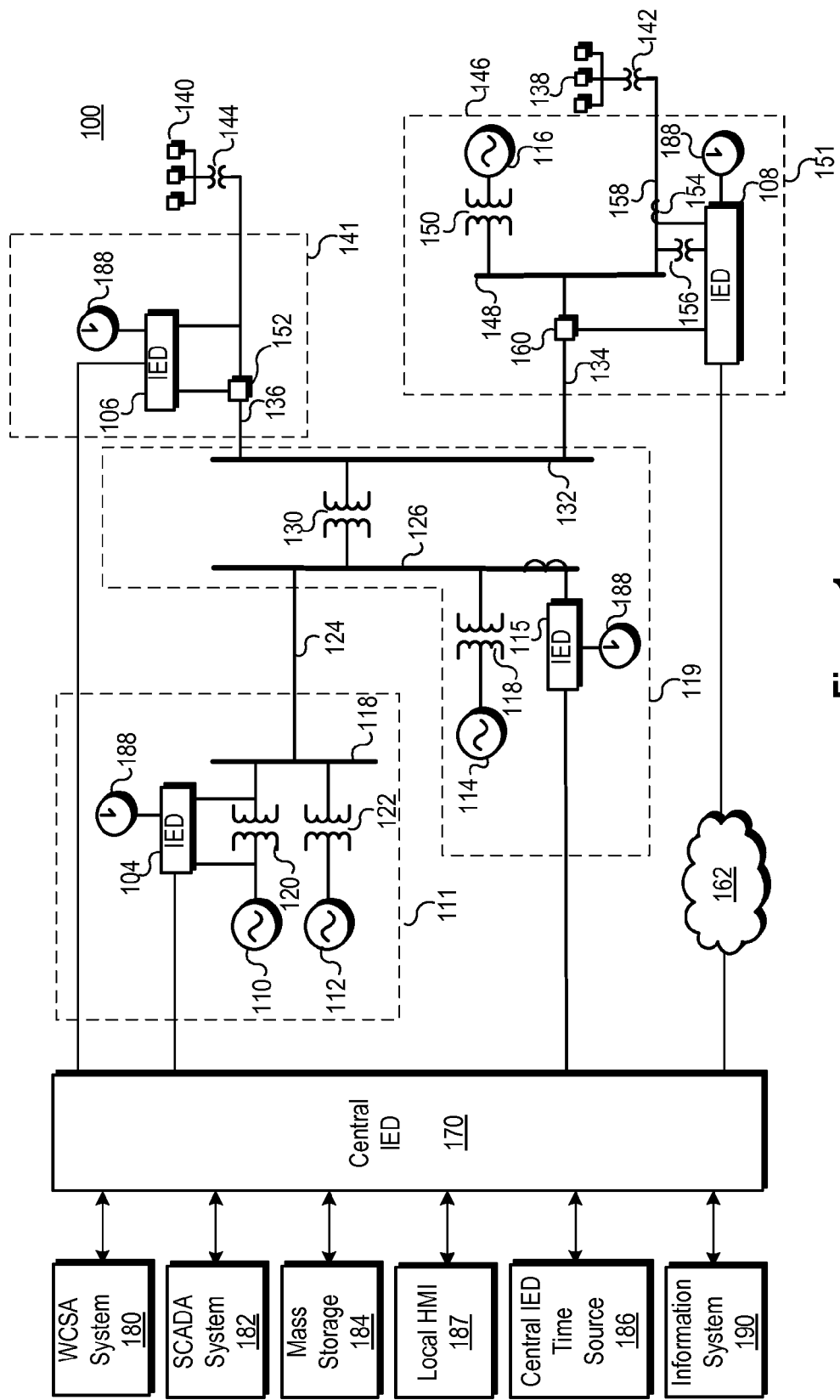
FIG. 1 illustrates a simplified one-line diagram of an electric power delivery system and associated intelligent electronic devices (IEDs) consistent with certain embodiments disclosed herein.

Electric power delivery systems may include electric power generation, transmission, and distribution equipment and loads that consume the electric power. For example, such systems include various types of equipment such as generators, transformers, circuit breakers, switches, distribution lines, transmission lines, buses, capacitor banks, reactors, loads, and the like. A purpose of electric power delivery systems is to generate and deliver usable electric power to an end user or load. Often, the generation sites are located at great distances from an end user or load. Generated electric power is typically at a relatively low voltage, but is transformed into a relatively high voltage before entering a transmission system. The voltage is again reduced for the delivery system, and often reduced yet again before ultimate delivery to the end user or load. The electric power may be monitored and controlled at various stages in the delivery system. Intelligent electronic devices (IEDs) are often used to collect electric power system information, make control and/or protection decisions, take control, automation, and/or protection actions, and/or monitor the electric power delivery system.

IEDs within an electric power delivery system may be interconnected by a variety of technologies and may utilize various communication protocols. The ability to configure electric power delivery system equipment using a standardized interface is becoming increasingly important. Engineers and others responsible for configuration, maintenance, and operation of electric power delivery systems may find it convenient to enter data using a consistent interface or utilizing a variety of devices. Due to the highly specialized nature of such equipment, proprietary interfaces and particularized software platforms may commonly be utilized in order to update settings, retrieve data, or otherwise interact with electric power system equipment. These proprietary interfaces and software platforms may allow for customization of the myriad settings commonly associated with complex electric power delivery systems.

One of the most ubiquitous communications platforms consists of web browsers. Systems and methods allowing the use of a web browser for facilitating interaction with electric power delivery system equipment may facilitate improved access to and interaction with such equipment; however, web browsers are not designed for creating or editing variable-length and/or variable-format data sets that may be utilized in interacting with electric power delivery system equipment.

While some electric power delivery system equipment may offer web-based interfaces, such interfaces may significantly constrain options for configuring such equipment. For example, many web-based systems allow for entering text into specific text areas or displaying individual input fields for every potential setting. In such a system, an operator must individually set each criteria, which may be a time-consuming and error-prone process.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. For example, various embodiments disclosed herein recite interactions between a server and a client connected by an electronic data communication network. The functions described as being performed by the server may be performed by the client and vice versa. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described herein include software modules or components. A software module or component may include any type of computer instruction or computer executable code located within a memory device and/or transmitted as electronic signals over a system bus, a wired network, or a wireless network. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a memory device, which together implement the described functionality of the module. A module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable and/or computer-readable medium having stored thereon instructions that may be used to program a computer (or other electronic device) to perform processes described herein. The medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified one-line diagram of an electric power delivery system 100 and associated IEDs 104, 106, 108, 115, and 170 consistent with certain embodiments disclosed herein. System 100 includes various substations and IEDs 104, 106, 108, 115, and 170 configured to perform various functions. System 100 is provided for illustrative purposes and does not imply any specific arrangements or functions required of any particular IED. In some embodiments, IEDs 104, 106, 108, 115, and 170 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 104, 106, 108, 115, and 170 may be configured to communicate calculations, such as phasors (which may or may not be synchronized as synchrophasors), events, fault distances, differentials, impedances, reactances, frequency, and the like. IEDs 104, 106, 108, 115, and 170 may also communicate settings information, IED identification information, communications information, status information, alarm information, and the like. Information of the types listed above, or more generally, information about the status of monitored equipment, may be generally referred to herein as monitored system data.

In certain embodiments, IEDs 104, 106, 108, 115, and 170 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of system 100. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be referred to as control instructions.

The electric power delivery system 100 illustrated in FIG. 1 may include a generation substation 111. Substation 111 may include generators 110 and 112, which are connected to a bus 118 through step-up transformers 120 and 122. Bus 118 may be connected to bus 126 in substation 119 via transmission line 124. Although the equipment in substation 111 may be monitored and/or controlled by various IEDs, only a single IED 104 is shown. IED 104 may be a transformer protection IED for transformer 120. IED 104 may be in communication with a common time source 188 which, as indicated below, may be distributed in system 100 using a communications network or using a universal time source, such as a global positioning system (GPS), or the like. Utilizing a common or universal time source may ensure that IEDs have a synchronized time signal that can be used to generate time synchronized data, such as synchrophasors.

Substation 119 may include a generator 114, which may be a distributed generator, and which may be connected to bus 126 through step-up transformer 118. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

A central IED 170 may be in communication with various IEDs 104, 106, 108, and 115, using a data communications network. IEDs 104, 106, 108, and 115 may be remote from central IED 170. The remote IEDs 104, 106, 108, and 115 may communicate over various media such as a direct communication from IED 106 or over a wide-area communications network 162. IEDs 104, 106, 108, 115, and 170 may be communicatively linked together using a data communications network, and may further be communicatively linked to a central monitoring system, such as a supervisory control and data acquisition (SCADA) system 182, an information system (IS) 190, and/or a wide area control and situational awareness (WCSA) system 180. The data communications network among IEDs 104, 106, 108, 115, and 170 may utilize a variety of network technologies, and may comprise network devices such as modems, routers, firewalls, virtual private network servers, and the like, which are not shown in FIG. 1.

The various IEDs in system 100 may obtain electric power information from monitored equipment using potential transformers (PTs) for voltage measurements (e.g., potential transformer 156), current transformers (CTs) for current measurements (e.g., current transformer 154), and the like. The PTs and CTs may include any device capable of providing outputs that can be used by the IEDs to make potential and current measurements, and may include traditional PTs and CTs, optical PTs and CTs, Rogowski coils, hall-effect sensors, and the like.

Each IED may be configured to access a common time source 188. Common time source 188 may be distributed via a communications network (using, for example, IEEE-1588 protocol, NTP protocol, or the like), or obtained locally at each IED. Common time source 188 may be a universal time, such as that delivered using GPS satellites, WWVB, WWV, or the like. A common time may be used to time-synchronize measurements of the electric power system and/or in the calculation of synchrophasors. Phasors calculated by the IEDs may include a time stamp indicating a time at which the measurement was made.

Central IED 170 may also be in communication with a number of other devices or systems. Such devices or systems may include, for example, a WCSA system 180, SCADA system 182, or local Human-Machine Interface (HMI) 187. Local HMI 187 may be used to change settings, issue control instructions, retrieve an event report, retrieve data, and the like. In some embodiments, WCSA system 180 may receive and process the time-aligned data, and may coordinate time synchronized control actions at the highest level of the electric power delivery system 100. Mass storage device 184 may store data relating to system 100 from IEDs 104, 106, 108, 115, and 170.

Central IED 170 may further include a time input, which may receive a time signal from a central IED time source 186. Central IED time source 186 may also be used by central IED 170 for time stamping information and data. Time synchronization may be helpful for data organization, real-time decision-making, as well as post-event analysis. Time synchronization may further be applied to network communications. Common time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a GPS receiver with time decoding. In the absence of a common time source available to all IEDs, central IED 170 may serve as a common time source by distributing a time synchronization signal.

Information system 190 generally includes hardware and software to enable network communication, network security, user administration, Internet and intranet administration, remote network access and the like. Information system 190 may generate information about the network to maintain and sustain a reliable, quality, and secure communications network by running real-time business logic on network security events, perform network diagnostics, optimize network performance, and the like.

Data communications between IEDs 104, 106, 108, 115, and 170 may occur using a variety of communication protocols and data formats. According to some embodiments, the communication protocols and data formats may be proprietary in some instances and standardized in some instances. For example, according to certain embodiments a TCP/IP protocol may be used to communicate HTML data among various devices associated with system 100. For example, the local HMI 187 may comprise a web browser configured to display HTML data. According to various embodiments consistent with the present disclosure, an operator may utilize a web browser in order to send or receive variable-length and/or variable-format data from any of IEDs 104, 106, 108, 115, and 170.

Figure 2:
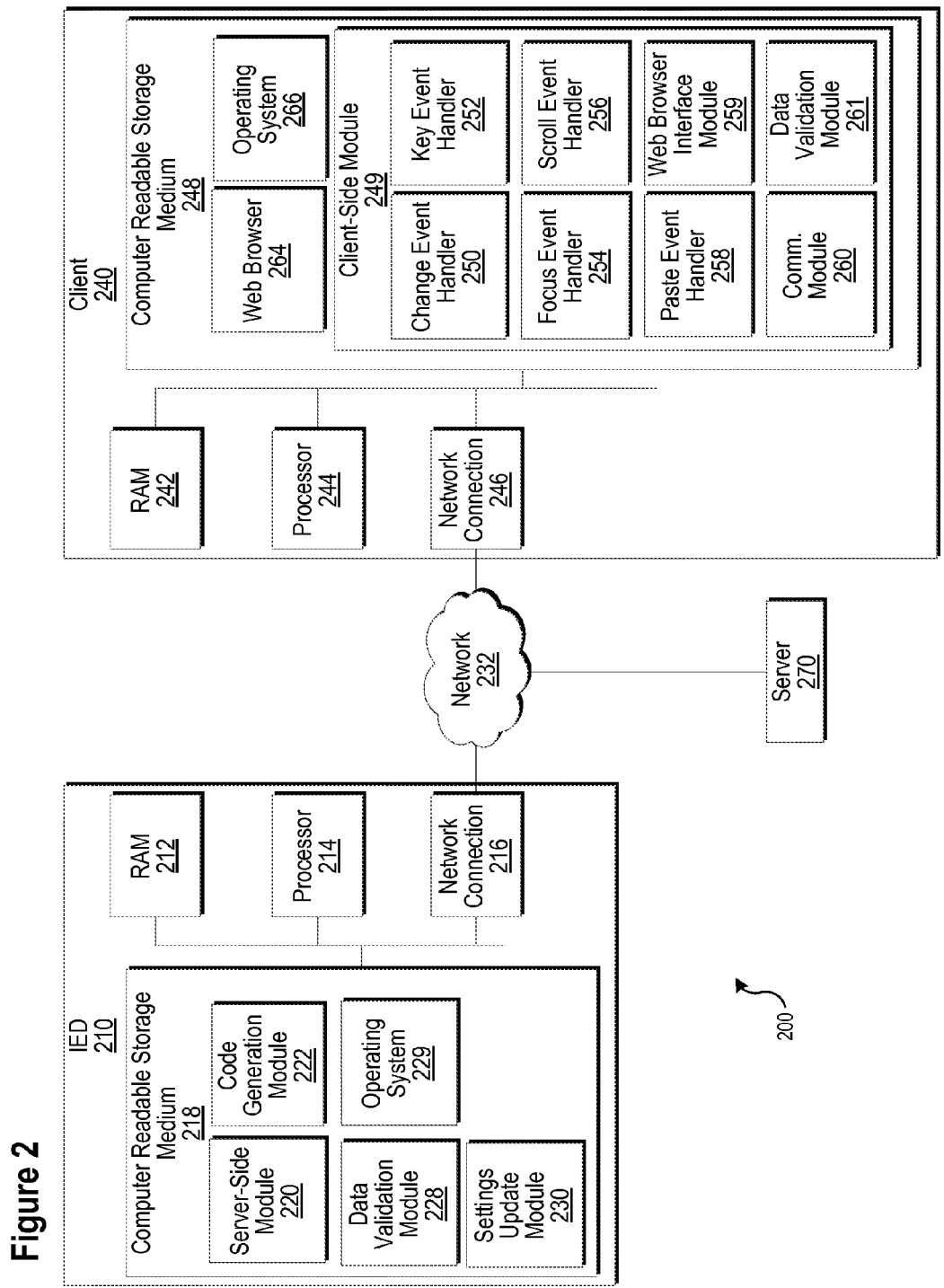
FIG. 2 illustrates a functional block diagram of a system consistent with certain embodiments disclosed herein that incorporates a server and a client connected via a network configured to permit an operator to utilize a web browser associated with the client to exchange variable length and/or variable format data with the server and/or an IED.

FIG. 2 illustrates a functional block diagram of a system 200 incorporating an IED 210 and a client 240 connected via a network configured to permit an operator to utilize a web browser associated with the client 240 to exchange variable length and/or variable format data with the IED 210 and/or a server 270. According to the illustrated embodiment, IED 210 also acts as a server with respect to its communications with client 240. According to further embodiments, some of the functionality embodied within IED 210 may be transferred to a server that is distinct from IED 210 (e.g., server 270). According to such embodiments, client 240 may primarily communicate with server 270, and server 270 may relay information to IED 210.

Network 232 may carry data traffic between IED 210, client 240, and server 270. The network 232 may operate using a variety of physical media, such as coaxial cable, twisted pair, fiber optic, etc. Further, the network 232 may utilize communication protocols such as Ethernet, TCP/IP, SONET, SDH, or the like, in order to communicate data. In further embodiments, the network 232 may include one or more wireless communication channels (e.g., a radio communication channel, a microwave communication channel, the satellite communication channel) utilizing any suitable wireless communication protocol.

IED 210 and client 240 may include similar hardware components, such as RAM, processors, network connections, and computer-readable storage mediums. Although these hardware components may differ in specific configuration and application, they may operate in a similar manner. According to the illustrated embodiment, IED 210 and client 240 each comprise RAM 212 and 242, a processor 214 and 244, a network connection 216 and 246, and a computer readable storage medium 218 and 248.

Processors 214 and 244 may be configured to process communications received via network connections 216 and 246. Processors 214 and 244 may operate using any number of processing rates and architectures. Processors 214 and 244 may be configured to perform various algorithms, calculations, and/or methods described herein. Processors 214 and 244 may be embodied as a general purpose integrated circuit, an application specific integrated circuit, a field-programmable gate array, and/or any other suitable programmable logic device. Processors 214 and 244 may perform logical and arithmetic operations based on program code stored by computer-readable storage medium 218 and 248, respectively.

Computer-readable storage mediums 218 and 248 may comprise various modules for implementing the functionality described herein, including any methods performed by the various systems disclosed herein. Computer-readable storage mediums 218 and 248 may comprise one or more non-volatile and non-transitory elements configured for storing data. Computer-readable storage mediums 218 and 248 may be implemented, according to various embodiments, using a variety of technologies, including hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

IED 210 and client 240 may each include computer-executable instructions stored on computer-readable storage media 218 and 248, respectively, that cause IED 210 and client 240 to implement various aspects of the functionality disclosed herein. Operating systems 229 and 266 may manage computer hardware resources and provide common services for computer programs. Operating systems 229 and 266 may be embodied as a variety of commercially available operating systems, such as Microsoft Windows, Unix, Linux, Macintosh, etc., or other commercially available or proprietary operating systems.

Client 240 may be implemented in a variety of ways, such as computers, workstations, terminals, virtual machines, and the like. Further, in alternative embodiments, a peer-to-peer system may be employed instead of the server-client system shown in FIG. 2. In such embodiments, the various modules illustrated in connection with the IED 210 may be executed on one or more peer computers. Still further, functionality associated with IED 210 or client 240 may be incorporated into server 270.

Computer-readable storage medium 248 includes a web browser 264. Web browser 264 may be operable to facilitate communication among devices connected to a network, such as the Internet, a wide area network, a local area network, etc. Web browser 264 may be configured to render webpages based upon code received from a server. According to various embodiments, web browser 264 may be configured to render webpages utilizing HTML, XHTML, XML, CSS, JavaScript, etc.

Client side module 249 may include a variety of handlers and modules relating to the interaction between client 240 and IED 210. As illustrated in FIG. 2, client side module 249 may include a plurality of event handlers configured to implement certain functionalities described in greater detail below. According to alternative embodiments, the various handlers may be included or excluded.

Change event handler 250 may be called by web browser 264 when the value in a data entry field containing data has been changed by the operator. The change event handler 250 may be configured to forward the newly entered data to IED 210 when new data is detected or when new certain conditions are met. For example, a condition may be set to transfer the data when certain data is altered or when a certain amount of data is entered and/or altered.

Change event handler 250 may also be called when a change has been transmitted to IED 210 but an acknowledgement of the change has not yet been received from IED 210. For example, various embodiments may allow for the entry of data via a web page that includes other links. If an operator selects one of the links on the web page containing the edited list, the edited data may be lost if the operator navigates away from the page prior to receiving confirmation that the changes have been processed. Accordingly, change event handler 250 may defer action until acknowledgement of data changes has been received. According to other embodiments, a warning or other notification may be provided to the operator in the event that input from the operator may result in the loss of data.

In further embodiments, change event handler 250 may facilitate the creation of printouts of pages (e.g., a web page) containing settings. Some web browsers may only allow a certain number of entries to be displayed in data entry fields when a web page is printed; however, for a printout to be useful in the context of making a record of settings associated with a piece of equipment in an electric power delivery system, all information available on the web page should be included. According to certain embodiments, change event handler 250 may include a special HTML code or tag in data entry fields. Following each update, the code may be updated with current data values and any error indicators that may exist. When the web page is printed, rules may be implemented to ensure that the data associated with the special HTML code or tag is shown on the printout. Accordingly, all available setting information may be printed, not just the portion visible on the screen.

Key event handler 252 may analyze and selectively implement keyboard commands received from an operator. According to certain embodiments, key event handler 252 may disallow keyboard input associated with a data field that is in a disabled or read-only state. Accordingly, key event handler 252 may prevent changes to certain data values, and/or may provide feedback to an operator regarding the operator's ability to change certain data fields. According to some embodiments, key event handler 252 may also be configured to manage the number of entries in a data field into which configuration settings may be entered. For example, pressing an "Enter" key may normally insert a new line into the data field. According to various embodiments of the present disclosure, key event handler 252 determines the maximum number of entries that can exist in the data entry field. Accordingly, if the data entry field already contains the maximum number of entries, key event handler 252 may search for a blank entry at the end of the data, and if a blank entry is found, the blank entry may be removed to allow the new line to be inserted. If there is no blank entry at the end of the list, the key press may be rejected. In this way, the operator may be prevented from directly adding more entries to the data entry area than the data entry area can support.

It may be possible for an operator to indirectly add too many entries to the setting using the copy and paste commands. According to one embodiment, excess entries added in this way may be allowed and may be transmitted to IED 210. IED 210 may then return an error message indicating to the operator that the maximum number of entries has been exceeded. According to other embodiments, a paste event handler 258 may be incorporated that may be configured to determine whether a paste command would result in an excessive number of entries or otherwise violate certain criteria associated with the entry of data into one or more data entry fields. Still further, paste event handler 258 may perform certain validation operations according to various embodiments.

Focus event handler 254 may record that a new setting has been focused and that the setting has not yet been edited. According to some embodiments, information about whether the currently focused setting has been edited may be used to prevent a setting which has been changed by the operator from being overwritten based on a response received from IED 210. For example, according to some embodiments, an XML file containing updated values may be returned by IED 210 after certain settings are updated. Focus event handler 254 may avoid the possibility of edited data being overwritten when the XML file update arrives from the server.

Scroll event handler 256 may be incorporated in various embodiments to synchronize display of data across one or more data entry fields. Scroll event handler 256 may synchronize data displayed in one data field so that the index values and error indicators correspond to the data shown in another data field. Scroll event handler 256 may be called each time a scroll command is received. Further, scroll event handler 256 may operate in conjunction with paste event handler 258 in instances where an operator inserts too many entries or otherwise violates validation rules using a paste command. Paste event handler 258 may prevent a situation in which the index is bounded by a maximum number of entries, but an operator attempts to insert a number of entries exceeding the bounded range. According to some embodiments, scroll event handler 256 may operate in conjunction with key event handler 252. Certain web browsers may differentiate between scroll events associated with a mouse and scroll events associated with a keyboard. Accordingly, scroll events associated with keyboard input may be passed by key event handler 252 to scroll event handler 256.

Figure 4:
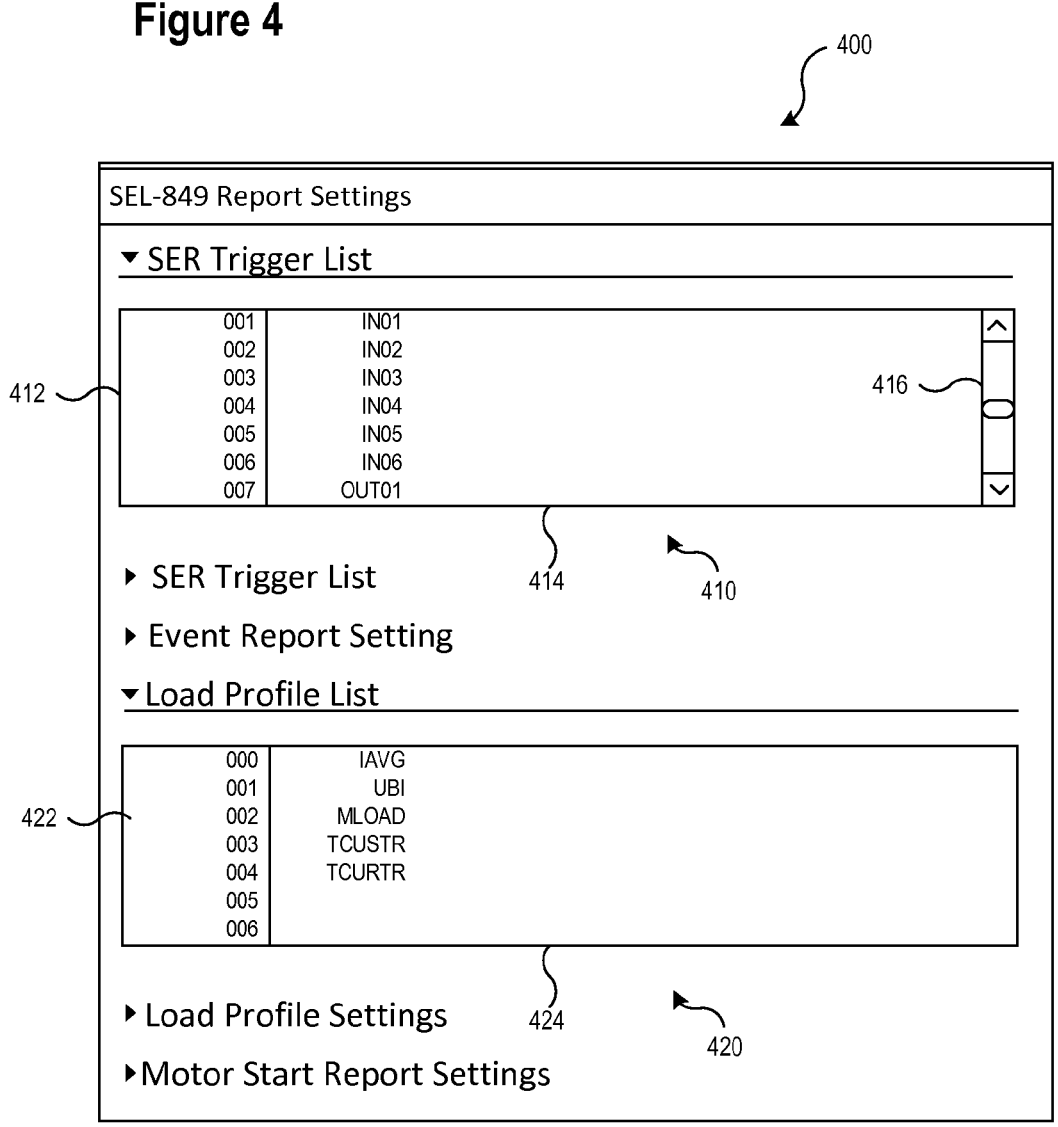
FIG. 4 illustrates a representative screen capture of one embodiment consistent with the present disclosure in which the display of certain data may be synchronized with the display of related data.

FIG. 4 illustrates a representative screen capture 400 of one embodiment consistent with the present disclosure in which the display of certain data may be synchronized with the display of related data. According to the illustrated embodiment, the data displayed in the data field 410 comprises two columns. An index column 412 may be displayed together with a data column 414. Scroll event handler 256 may synchronize data displayed in index column 412 and data column 414. In other words, scroll event handler 256 may automatically adjust the data displayed in index column 412 based upon the data displayed in data column 414. According to one embodiment, scroll event handler 256 may utilize cascading style sheets (CSS) properties to prevent an operator from independently scrolling across data displayed in index column 412. In contrast, data column 414 may include a scroll bar 416 configured to allow an operator to freely scroll through the data values.

Returning to a discussion of FIG. 2, web browser interface module 259 may be configured to coordinate interaction between client-side module 249 and web browser 264. Web browser interface module 259 may be implemented in a variety of ways that may permit client-side module to receive data from web-browser 264 and provide data to web-browser 264. For example, web browser interface module 259 may be embodied, according to some embodiments using JavaScript, ActiveX, Flash, Silverlight, etc. Web browser interface module 259 may be configured to collect data from various data entry fields into which an operator may enter data and compile such data into an object suitable for transmission to IED 210. According to some embodiments, a web browser interface module 259 may generate an XML object containing data entered by an operator into a web browser.

Communication module 260 may be configured to facilitate the communication of data with IED 210. Communication module 260 may be configured, according to certain embodiments, to transmit certain data entered by a user into a web browser to IED 210. Further communication module 260 may be configured to retrieve information, such as error messages, data updates, and the like, from IED 210. Communications module 260 may be configured to facilitate communication between IED 210 and client 240 according to a variety of communications protocols.

A client-side data validation module 261 may be configured to determine whether data entered by an operator satisfies a plurality of validation rules. Validation rules may evaluate a number of factors and/or criteria associated with the data entered by an operator. For example, according to some embodiments, client-side data validation module 261 may analyze data entered by an operator in order to determine whether the data comprises redundant or duplicate entries. In another example, client-side data validation module 261 may determine whether data entered by an operator falls within the specified ranges or boundaries. Still further, client-side data validation module 261 may determine whether data entered by an operator is an appropriate type (e.g., integer, string, double, etc.). Any number of other data validation functions may also be implemented by client-side data validation module 261.

Returning to a discussion of IED 210, computer-readable storage medium 218 may also comprise a variety of modules configured to implement various functions described herein. Server-side module 220 may be configured to coordinate interaction with client-side module 249. More specifically, server-side module 220 may be configured to coordinate the operation of various data modules associated with IED 210 and to communicate status updates, errors, and other information to client-side module 249.

Code generation module 222 may generate code (e.g., dynamically generate code) to be transmitted to client 240. Code generated by code generation module 222 may comprise dynamically generated webpages that communicate status updates and errors relating to input received from client 240. Code generation module 222 may generate code in a variety of formats supported by web browser 264, including HTML, XHTML, XML, CSS, JavaScript etc. According to various embodiments, code generation module 222 may utilize code in a variety of formats (e.g., PHP or ASP) in order to generate code transmitted to client 240.

Code generation module 222 may further generate appropriate code for display data associated with equipment in an electric power delivery system. For example, returning to a discussion of FIG. 4, data displayed in each of windows 410 and 420 may be generated by code generation module 222. The data displayed in windows 410 and 420 may be encoded in an HTML format and rendered by client 240 as one list item per line, as shown in FIG. 4. According to some embodiments utilizing HTML encoding, each line may be terminated with a CR or CRLF character. In addition to putting the data values shown in data columns 414 and 424, code generation module 222 may further be responsible for generation of index columns 412 and 422. According to various embodiments, index columns may include leading zeros in order to make the display of data more consistent.

Returning to a discussion of FIG. 2, data validation module 228 may be configured to detect an error in data received from client 240. If data validation module 228 detects an error, the error may be displayed to an operator using dynamically generated code produced by code generation module 222. Data validation module 228 may determine the validity of data using a variety of methods and techniques known in the art. For example, data validation module 228 may evaluate a plurality of conditions in order to ensure that data changes result in an operable configuration. In cases where data changes may result in equipment associated with an electric power delivery system becoming inoperative, a validation error may occur. Further, a validation error may occur in instances where an operator attempts to add an excessive number of entries, for example using a cut and paste command.

Figure 5:
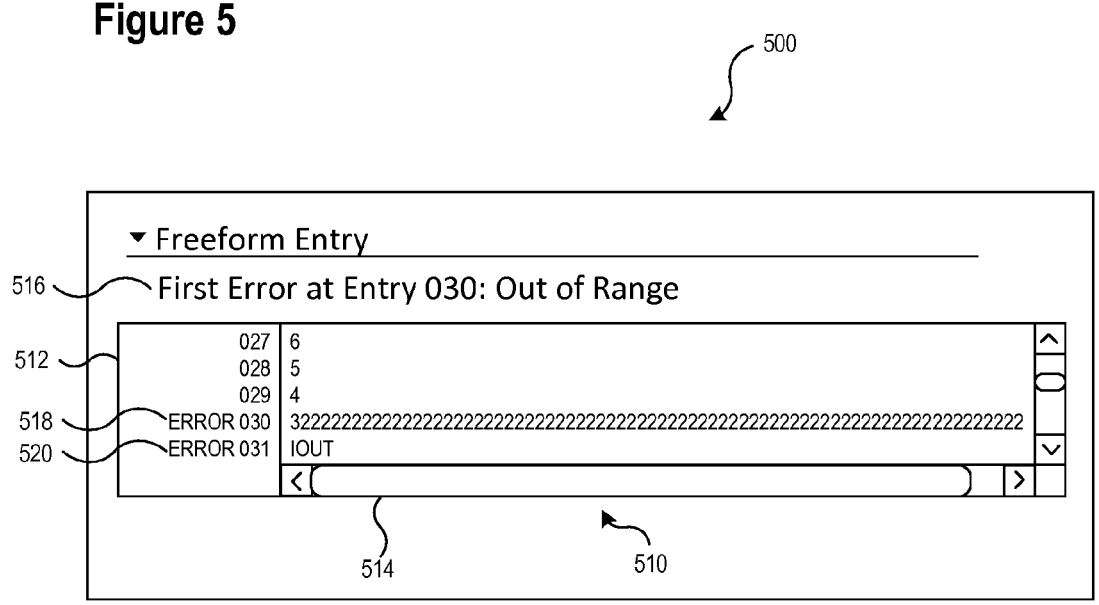
FIG. 5 illustrates a representative screen capture, in which a validation error is displayed to an operator consistent with various embodiments of the present disclosure.

FIG. 5 illustrates a representative screen capture 500, in which a validation error is displayed to an operator consistent with various embodiments of the present disclosure. Screen capture 500 illustrates a window 510 comprising an index column 512 and a data column 514. According to various embodiments, an operator may be permitted to enter data into data column 514. Such data may be submitted to a server (not shown) for validation prior to such data being used to configure equipment associated with an electric power delivery system. In one possible embodiment, an error message 516 indicates an error at entry 030. Error message 516 may provide an indication to an operator that data entered in data column 514 did not pass a validation test. Data that fails to pass a validation test may be rejected by the server, and the operator may take appropriate steps to correct the error.

Error message 516 may be configured to identify a first error; however, multiple errors may be identified in column 512. Errors 518 and 520 are displayed and designate errors associated with entries 030 and 031. As noted in error message 516, error 518 is an "out of range" error. For example, the validation test may require a integer value within a bounded range associated with entry 030. Error 520 may correspond to a "type" error. For example, the validation test may require an integer value associated with entry 031. Error 520 may be identified, according to the illustrated embodiment, since a "string" data value is entered where an integer value was expected. According to some embodiments, additional information relating to an error may be provided to an operator in a variety of ways. According to one embodiment, a tooltip message may be displayed when a cursor is placed over the error message or placed over data column 514. According to another embodiment, a pop-up window may be displayed when a user clicks on the error message.

Returning to a discussion of FIG. 2, settings update module 230 may receive data, after such data has been validated, and may update settings associated with server 270 or other electric power delivery system component connected to network 232. According to some embodiments, IED 210 may be configured to translate between communications protocols used by client 240 and server 270. For example, IED 210 may communicate with server 270 utilizing DNP3, MODBUS RTU, MODBUS TCP, IEC 61850 and IEEE C37.118.

Figure 3A:
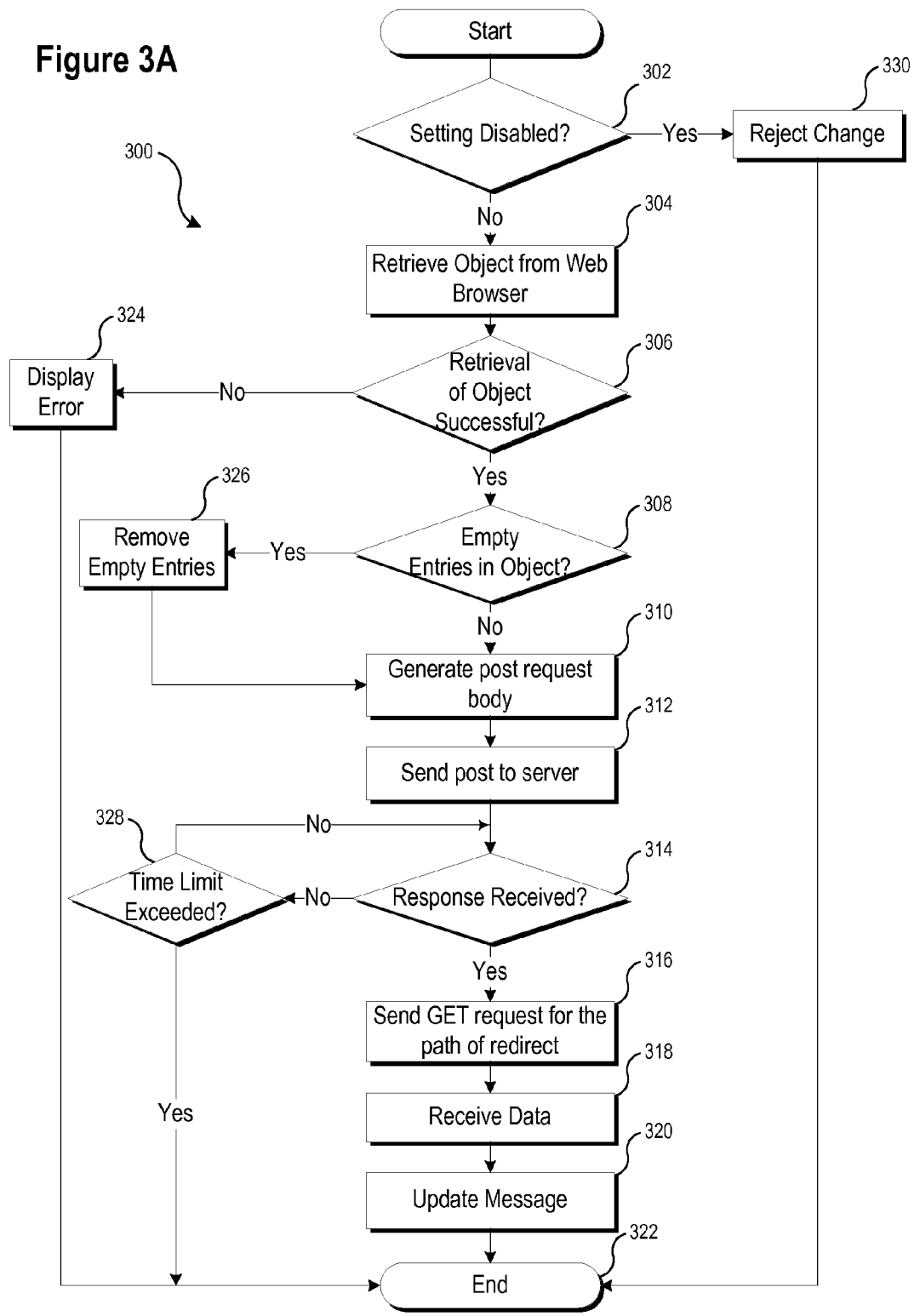
FIG. 3A illustrates a flow chart of one embodiment of a method performed by a client configured to permit an operator to utilize a web-based form for entry of data associated with equipment in an electric power delivery system, according to various embodiments consistent with the present disclosure.

FIG. 3A illustrates a flow chart of one embodiment of a method 300 performed by a client configured to permit an operator to utilize a web-based form for entry of data associated with equipment in an electric power delivery system, according to various embodiments consistent with the present disclosure. At 302, method 300 may determine whether data entered by the operator in a web browser relates to a setting that is disabled. According to some embodiments, a disabled setting may be set using the read-only permission. If it is determined that a setting is disabled, the change may be rejected at 330. According to other embodiments, a user may be prevented from entering data into a field that is designated as read-only or disabled. For example, such fields may be "greyed out" or omitted from a page displayed to an operator.

If this setting is not disabled, method 300 may retrieve from the web browser an object containing input from an operator at 304. According to some embodiments, the object may comprise an XML file. According to other embodiments, a proprietary format, or other public format may be utilized for generating the object. A client-side module, such as the client-side module 249 described above in connection with FIG. 2, may be responsible for retrieval of the object from the web browser. According to some embodiments, the client-side module may be implemented using JavaScript, and may be configured for interaction with a variety of types of web browsers.

Returning to a discussion of FIG. 3A, at 306, method 300 may determine whether retrieval of the object was successful. If retrieval of the object at 306 was not successful, an error may be displayed at 324. If retrieval of the object was successful, method 300 may determine at 308 whether the object contains any empty entries. If so, the empty entries may be removed at 326.

A post request may be generated at 310 and sent to a server at 312. The post request may be transmitted using a network connecting the client and the server. The network may be embodied in a variety of ways, including the Internet, a wide area network, a local area network, a virtual private network, etc. Similarly, data may be transmitted between the client and the server using a variety of communications protocols and data formats.

At 314, the client may determine whether a response has been received to the post sent to the server. If a response has not been received, at 328, it may be determined whether a time limit has been exceeded. If the time limit has not been exceeded, method 300 may return to 314 and await a response. If the time limit has been exceeded, method 300 may end at 322.

According to one embodiment, the response may include a redirect and a URL at which the client may retrieve updated/edited data processed by the server. Upon receipt of the redirect, the client may be configured to send a get request to the redirect path at 316. The updated/edited data may be retrieved by the client at 318. According to some embodiments, data received at 318 may be used to update information displayed to an operator. At 320, a message may be updated. The update may communicate to the operator that data has been successfully transmitted and processed by the server. At 322, method 300 may end.

Figure 3B:
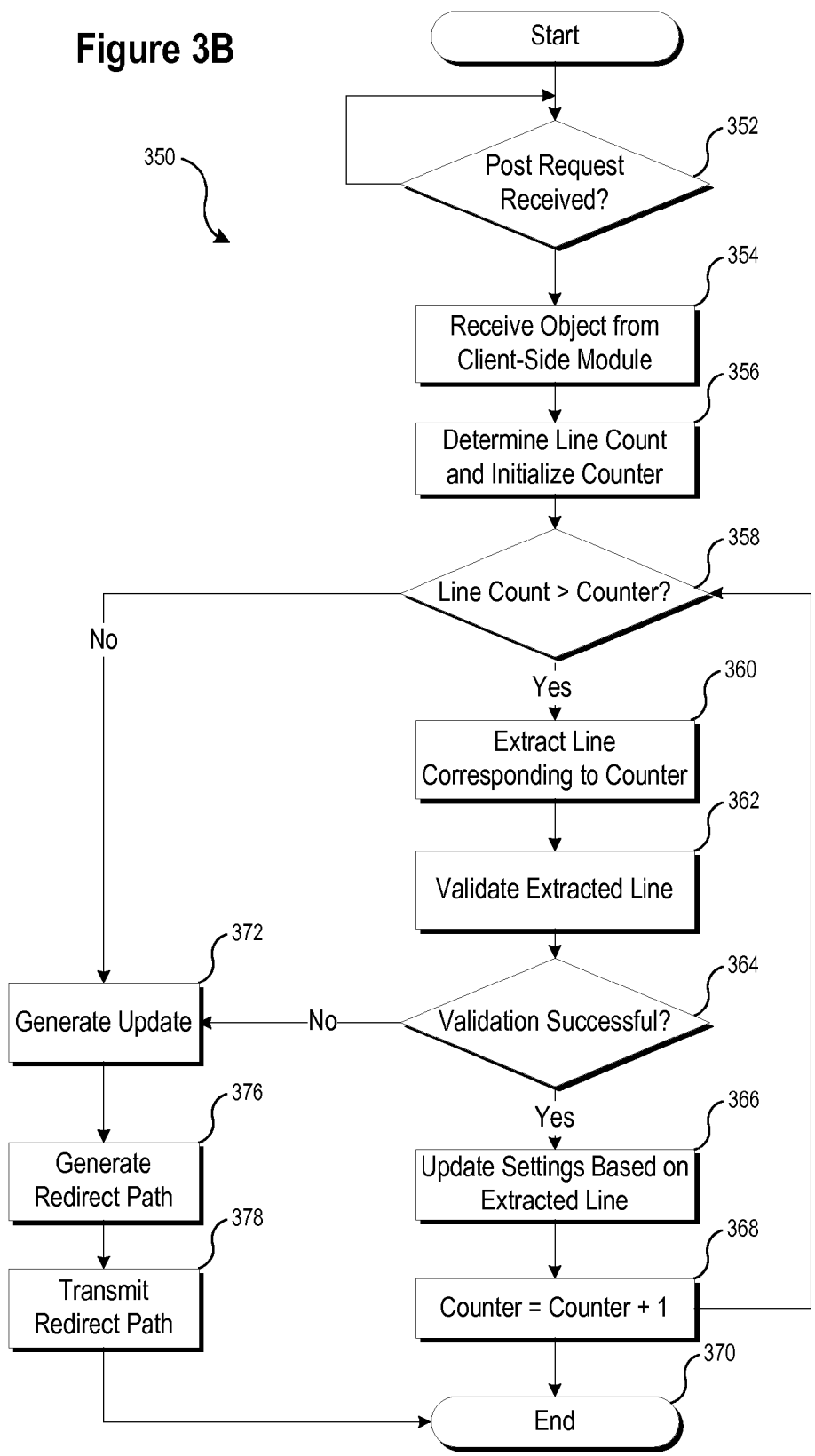
FIG. 3B illustrates a flow chart of one embodiment of a method performed by a server configured to receive process data received from a client and entered by an operator using a web browser, according to various embodiments consistent with the present disclosure.

FIG. 3B illustrates a flow chart of one embodiment of a method 350 performed by a server configured to receive process data received from a client and entered by an operator using a web browser, according to various embodiments consistent with the present disclosure. At 352, method 350 may await receipt of a post request from a client. At 354, an object may be received from a client-side module associated with the client.

After receiving the object, various steps may be taken to process the object. According to one embodiment, a line count associated with the object may be determined and a counter may be initialized at 356. At 358, method 350 may determine whether the line count is greater than the counter. If the line count is greater than the counter, additional data associated with the object may require processing. At 360, a line corresponding to the counter may be extracted from the object. The extracted line may be validated at 362. As described above in connection with data validation module 228, validation of data may involve a variety of methods and techniques for evaluating the data and changes to equipment associated with an electric power delivery system represented by the data.

If the data validation was successful, settings associated with the extracted line may be updated at 366. At 368, the counter may be incremented, and method 350 may return to 358. If the validation fails, an update may be generated at 372. The update may include an indication that validation of the data was not successful.

When each line of an object has been processed, and thus the line count does not exceed the counter, at 372, an update may be generated that the object was successfully processed. The update may be associated with a redirect path generated at 376, and at 378, the redirect path may be transmitted to the client. As described above, the redirect path may be used by the client to access the update.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A computer program product, comprising a non-transitory computer-readable medium having executable computer program code, the computer program product comprising:
 a client-side module configured to communicate with a server-side module, the client-side module comprising:
  a web browser interface module configured to retrieve data entered by an operator into a data entry field of a web browser;

a user interface module configured to display variable length data to a user via the web browser;

a communication module configured to manage communication with the server-side module, the communication module configured to:
    generate an object comprising data entered by the user into the web browser, the object comprising at least one setting associated with an electric power utility system;
    transmit the object to the server; and
    receive a response from the server;

a scroll event handler configured to synchronize display a result in the web browser based on the response across two or more data entry fields based upon a scroll event;

wherein the two or more data entry fields comprise an index column and at least one data column, and each of a plurality of values in the data column are associated with a corresponding value in the index column.

2. The computer program product of claim 1, wherein the communication module is further configured to generate a post request.

3. The computer program product of claim 2, wherein the response from the server comprises a redirect path, and the communication module is further configured to access the redirect path and retrieve data available at the redirect path.

4. The computer program product of claim 1, further comprising a change event handler configured to receive an indication from the browser that data entered by the user has changed.

5. The computer program product of claim 4, wherein the change event handler is further configured to defer action based on user input during a time period between transmission of the object to the server and receipt of the response from the server.

6. The computer program product of claim 1, wherein the user interface module is further configured to adjust the size of the data entry field on a printed version to display the entire variable length data.

7. The computer program product of claim 1, wherein an error message associated with a value in the data column is displayed on the corresponding value in the index column.

8. The computer program product of claim 1, further comprising a key event handler configured to selectively disallow input from a keyboard based upon one of a condition associated with a data entry field and a number of entries in the data entry field.

9. The computer program product of claim 1, further comprising a paste event handler configured to determine whether a number of entries associated with a paste command exceeds a maximum number of entries associated with a data entry field.

10. The computer program product of claim 1, further comprising a client-side data validation module configured to evaluate the data entered by the operator into the data entry field based upon a plurality of data validation rules.

11. The computer program product of claim 10, wherein the validation rule is configured to evaluate the data and identify duplicate entries in the data.

12. The computer program product of claim 10, wherein the validation rule is configured to determine whether the data falls within a bounded range.

13. A computer program product, comprising a non-transitory computer-readable medium having executable computer program code, the computer program product comprising:
    a server-side module configured to communicate with a client-side module, the server-side module comprising:
    a communication module configured to manage communication with the client-side module, the communication module configured to:
        receive a variable length data pasted by an operator into a web browser using a paste command;
        determine, using a paste event handler, whether a number of entries associated with the paste command exceeds a maximum number of entries associated with a data entry field to receive the variable length data;
        validate, using a data validation module, the variable length data entered by the operator;
        update a setting associated with an electric power delivery system based on the variable length data;
        generate a response; and
        post updated data for retrieval by the client-side module;
        transmit the response to the client-side module;
        serve the updated data to the client-side module in response to a request from the client-side module.

14. The computer program product of claim 13, wherein the communication module is further configured to generate an error message based upon detection of a validation error detected by the data validation module.

15. A method for receiving electric power delivery system data via a web-based interface, comprising:
    receiving a variable length data input pasted by an operator into a web browser using a paste command;
    determining whether a number of entries associated with the paste command exceeds a maximum number of entries associated with a data entry field to receive the variable length data;
    retrieving the input from the web browser;
    generating an object based on the input;
    transmitting the object to a server;
    validating the variable length data entered by the operator;
    updating a setting associated with an electric power delivery system based on the variable length data;
    generating a response; and
    transmitting the response to the operator.

16. The method of claim 15, wherein validating the variable length data input comprises identifying invalid data based upon a criterion.

17. The method of claim 16, wherein the criterion comprises one of a predetermined length, a data type, a bounded range, and a duplicate entry.

18. The method of claim 15, further comprising deferring action based on operator input after transmitting the object to the server and before receiving the response from the server.

19. The method of claim 15, further comprising determining that the response from the server has been received prior to generating a subsequent object.

20. The method of claim 15, further comprising:
    determining that the input corresponds to a disabled setting; and
    rejecting a change included in the input.

* * * * *